United States Patent [19]

Maase et al.

[11] Patent Number: 5,650,842
[45] Date of Patent: Jul. 22, 1997

[54] DEVICE AND METHOD FOR OBTAINING A PLAIN IMAGE OF MULTIPLE FINGERPRINTS

[75] Inventors: Daniel Frederick Maase, Campell; Thomas Frank Sartor, Sunnyvale, both of Calif.

[73] Assignee: Identix Incorporated, Sunnyvale, Calif.

[21] Appl. No.: 549,537

[22] Filed: Oct. 27, 1995

[51] Int. Cl.$^6$ .................................. G06K 9/74; G06K 9/00
[52] U.S. Cl. ............................ 356/71; 382/124; 382/125; 382/126; 382/127
[58] Field of Search ................. 356/71; 382/124–127

[56] References Cited

U.S. PATENT DOCUMENTS

| | | |
|---|---|---|
| 3,174,414 | 3/1965 | Myer . |
| 3,482,498 | 12/1969 | Becker . |
| 3,527,535 | 9/1970 | Monroe ........................ 356/71 |
| 3,619,060 | 11/1971 | Johnson ........................ 356/71 |
| 3,702,731 | 11/1972 | Wood, Jr. ..................... 356/71 |
| 3,947,128 | 3/1976 | Weinberger et al. ......... 356/71 |
| 3,975,711 | 8/1976 | McMahon ..................... 356/71 |
| 4,120,585 | 10/1978 | DePalma et al. ............. 356/71 |
| 4,151,512 | 4/1979 | Riganati et al. . |
| 4,537,484 | 8/1985 | Fowler et al. . |
| 4,681,435 | 7/1987 | Kubota et al. ............... 356/71 |
| 4,792,226 | 12/1988 | Fishbine et al. ............. 356/71 |
| 4,933,976 | 6/1990 | Fishbine et al. . |
| 5,067,162 | 11/1991 | Driscoll, Jr. et al. . |
| 5,416,573 | 5/1995 | Sartor, Jr. ................... 356/71 |

FOREIGN PATENT DOCUMENTS

3421220 A1  12/1985  Germany .

*Primary Examiner*—Frank G. Font
*Assistant Examiner*—Jason D. Vierra Eisenberg
*Attorney, Agent, or Firm*—Fish & Richardson P.C.

[57] ABSTRACT

A device for providing a plain image signal indicative of a plain image of surface characteristics of more than one finger on a hand includes an plain platen prism having a flat, rectangular shaped finger receiving surface having a platen aspect ratio greater than 1.33:1. An illumination source internally illuminates the finger receiving surface such that light internally illuminating a bare portion of the finger receiving surface is internally reflected from the finger receiving surface and light internally illuminating a contacted portion of the finger receiving surface in contact with the fingers is not internally reflected from the finger receiving surface. The internally reflected light forms a reflection image of the surface characteristics of the fingers. Optical elements direct the reflection image to a camera. The camera, which has a rectangular receiving surface with an aspect ratio of approximately 1.33:1, receives the reflection image and provides the plain image signal in response. The directing optical elements include refracting elements structured and arranged to change the aspect ratio of the reflection image to approximately equal the camera receiving surface aspect ratio.

23 Claims, 5 Drawing Sheets

DEVICE AND METHOD FOR OBTAINING A PLAIN IMAGE OF MULTIPLE FINGERPRINTS

BACKGROUND OF THE INVENTION

1. Field of the Invention

The invention relates to electronic image capture devices, and, in particular, to an optical arrangement that enables the device to simultaneously image up to four fingers on a rectangular platen surface having an aspect ratio greater than the aspect ratio of an imaging camera sensor array.

2. Description of the Prior Art

Until recently, law enforcement agencies and other security conscious entities made fingerprint records of individual subjects by inking the subject's fingers and then pressing or rolling the fingers onto a card with designated spaces for the various prints. A typical, so called "ten-print" card 10 of fingerprints, illustrated in FIG. 1, includes a "rolled" impression 12 of each fingertip, "slap", or plain, impressions 14 of the four fingers on each hand, and plain impressions 16 of each thumb.

Figure 1:
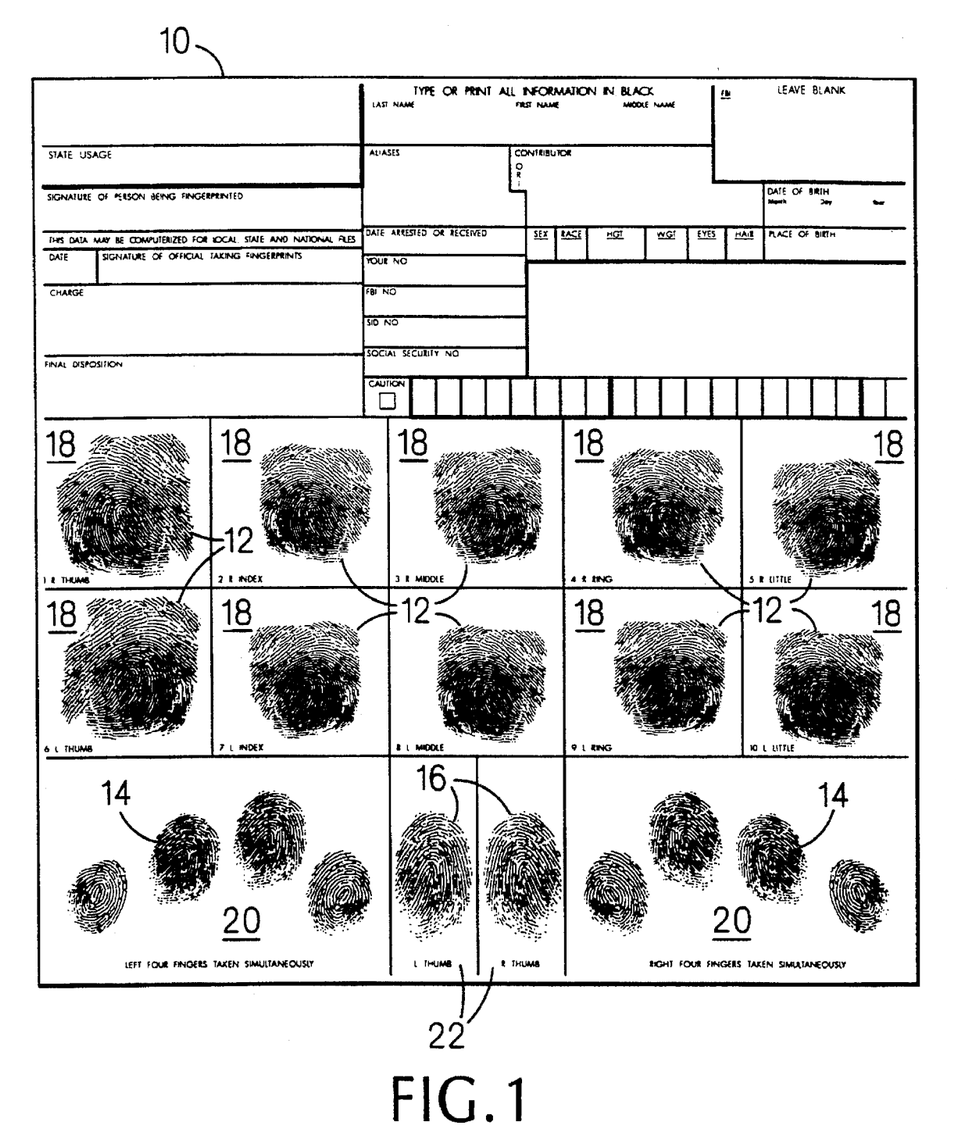
FIG. 1 is an illustration of a typical 10-print fingerprint card.

A rolled impression is taken with an ink and paper system by placing a side of the inked fingertip on a selected space delineated on a standard sized fingerprint card, and rolling the fingertip from fingernail to fingernail once across the space. This process is repeated for each finger and thumb. A four-finger plain impression is taken by simultaneously pressing the inked four fingertips of one hand on a selected space on the fingerprint card. Slap imprints of the thumbs are taken separately. The roll impression spaces 18 are 1.6 inches wide by about 1.5 inches high. The four-finger plain impression spaces 20 are about 3.2 inches wide by about 2 inches high. The spaces 22 for the plain thumb impressions are about 0.8 inches wide by about 2 inches high.

Alternatively, agencies can use electronic fingerprint imaging systems to capture fingerprint images. The electronic systems have several advantages. An electronically generated image can be reproduced, stored or retrieved easily. Persons at one location can quickly transmit an accurate electronic image to another location by facsimile or by transferring a file between computers that are linked together by, for example, a modem connection. Obtaining an electronic image is quick and clean. No ink needs to be applied or removed from a subject's fingers, as with prior art paper and ink systems.

Prior art electronic fingerprint imaging systems typically include a single optical system for both the rolled and the plain images, or a pair of independent optical systems, one for rolled images and one for a plain four-finger image, contained in a cabinet that is configured to exclude stray light and dust. Each optical system may have one or more imaging cameras dedicated to that system. Each camera typically includes a CCD array configured with a 4:3 aspect ratio, i.e. with a light sensing surface having a width that is one third larger than its height. A typical CCD array of this type will have about 485 horizontal lines with 400 to 800 pixel elements in each line.

Each optical system includes a transparent platen prism mounted in the cabinet. Each platen prism has a finger receiving surface that is exposed, typically at the top of the cabinet. A light source in the cabinet directs light through a face of the optical platen prism to the finger receiving surface at an angle $\phi$ that is greater than the critical angle for total internal reflection at the platen/air interface. Light that illuminates covered portions of the finger receiving surface of the platen prism, such as are in contact with skin features, for example fingerprint ridges, is not internally reflected. Light that illuminates bare portions of the finger receiving surface of the platen prism, such as are located below valleys between fingerprint ridges, is internally reflected.

A reflection image of the fingerprint is thereby formed. Dark portions of the reflection image are representative of raised skin features; light portions of the reflection image are representative of indented skin features and uncovered regions of the finger receiving surface that surround the finger. The reflection image is transmitted through a second side of the optical platen prism and then directed to the imaging camera or cameras.

Some systems use an alternate technique. A finger receiving surface of the platen prism is illuminated from below or in a direct fashion wherein the light penetrates the finger receiving surface. The finger receiving surface is still imaged at an angle above the critical angle for the platen/air interface. Where the finger contacts the platen, the light will diffuse into the platen prism and a portion of this diffused light will be imaged. Light directed from above the platen/air interface, where there is no contact, is not diffused back into the platen prism and cannot be imaged. A light image of the fingerprint appears in a dark background. This is referred to as a "weak image" since only a small fraction of the illumination is imaged. The other form, the reflection image, is referred to as the "strong image."

Since a four-finger plain impression is about 3.2×2 inches, it requires a final image signal with an aspect ratio of about 1.6:1. Prior art systems typically illuminate the finger receiving surface through a long side at the front of the platen prism. Since the angle $\phi$ at which the contact surface is viewed is typically about 45°, the aspect ratio will be increased by about 1/cos $\phi$ to about 2.2:1. Most CCD camera arrays in commercial use have an aspect ratio of 1.33:1, so they are not very effective for imaging a fingerprint reflection image having an aspect ratio of 2.2:1.

The prior art solution has been to obtain partially overlapping images off side-by-side regions of the finger receiving surface. These systems then electronically stitch together the signals representing the overlapping images to provide a signal representing an image of the entire finger receiving surface. A first type of system uses a single camera and moves the optics on a carriage to sequentially take a series of images covering the entire finger receiving surface. A second method uses up to four cameras in a fixed optical system to simultaneously take images of adjacent regions of the finger receiving surface. Each approach requires complex data processing to perform the image stitching.

Therefore, it is an object of the invention to provide a fingerprint image capture device that can obtain a four-finger plain image with fixed optical components and a single imaging camera.

Another object of the invention to provide an optical system for a fingerprint image capture device that matches the aspect ratio of the imaging camera to the aspect ratio of the finger receiving surface of the optical platen prism for four-finger plain images.

Yet another object of the invention to provide a fingerprint image capture device that can capture the entire field of a four-finger plain image with a single camera exposure.

SUMMARY OF THE INVENTION

These objects and others are obtained according to the invention with a device for providing a seamless plain image signal indicative of a plain image of surface characteristics of a plurality of fingers on a hand. The device includes a plain platen prism having a flat, rectangular shaped finger receiving surface that has a platen aspect ratio greater than 1.1:1. An illumination source is structured for internally illuminating the finger receiving surface such that an image of the surface characteristics of the fingers is formed. The image can be formed from a pattern of internally reflected light (strong image) or from a pattern of diffused light (weak image). Optical elements are structured and arranged to receive the image leaving a side surface of the platen prism from a direction transverse to the shorter sides of the finger receiving surface. The optical elements thereupon direct the image to an aperture of a camera having a rectangular receiving surface that has a camera aspect ratio of greater than 1.1:1 and less than the platen aspect ratio. The camera receives the image, and provides the plain image signal in response.

The optical elements include refracting elements that change the aspect ratio of the image to approximately equal the camera aspect ratio. Preferably, the magnification of the optical elements is chosen to match the height of the image, which is the same as the height of the finger receiving surface, to the height of the camera receiving surface, and by changing the aspect ratio of the image to match the width of the camera receiving surface.

According to another aspect of the invention, all of the optical components are mounted at fixed positions.

According to another aspect of the invention, a single camera is used to provide the plain image signal.

According to another feature of the invention, the camera includes a rectangular CCD array of light intensity sensing elements that form the camera receiving surface.

According to another feature of the invention, the platen aspect ratio is approximately 1.6:1 and the camera aspect ratio is approximately 1.33:1.

The invention also provides a method of providing a plain image signal indicative of surface characteristics of up to four fingers on a hand, including the steps of providing a platen prism that has a flat, rectangular shaped finger receiving surface having a width being greater than its height and defining a platen aspect ratio, being significantly greater than 1:1 preferably approximately 1.6:1, and spaced-apart angled side surfaces extending from short edges of the finger receiving surface and that form acute included angles with the finger receiving surface. The method also provides a single camera that has a rectangular-shaped, light intensity sensing receiving surface with width and a height defining a camera aspect ratio that is greater than 1.1:1 and less than the platen aspect ratio, and preferably approximately 1.33:1.

The method further includes the steps of placing on a hand on the finger receiving surface, internally illuminating the finger receiving surface, and forming a plain image from a pattern of light from the finger receiving surface, the plain image being indicative of the surface characteristics of the fingers, wherein the plain image is directed transverse to a direction defined by the finger receiving surface height.

Further steps include directing the plain image to the camera, including changing the aspect ratio of the plain image to approximately equal the camera aspect ratio, and receiving the first image on the camera receiving surface and providing the four finger plain image signal in response thereto.

Unlike prior art systems, which typically build a four-finger plain image signal by electronically stitching together signals representing images of different regions of a finger receiving surface, the present system can capture an image of fingerprints on the entire four-finger receiving surface. The imaging camera provides a real-time signal representing the four-finger plain image without complicated processing for stitching multiple images together. Whereas prior art systems use multiple cameras or movable optical components that can move out of alignment with use, the present system obtains the four-finger plain image with a single camera and fixed optics.

DESCRIPTION OF THE PREFERRED EMBODIMENTS

Figure 2:
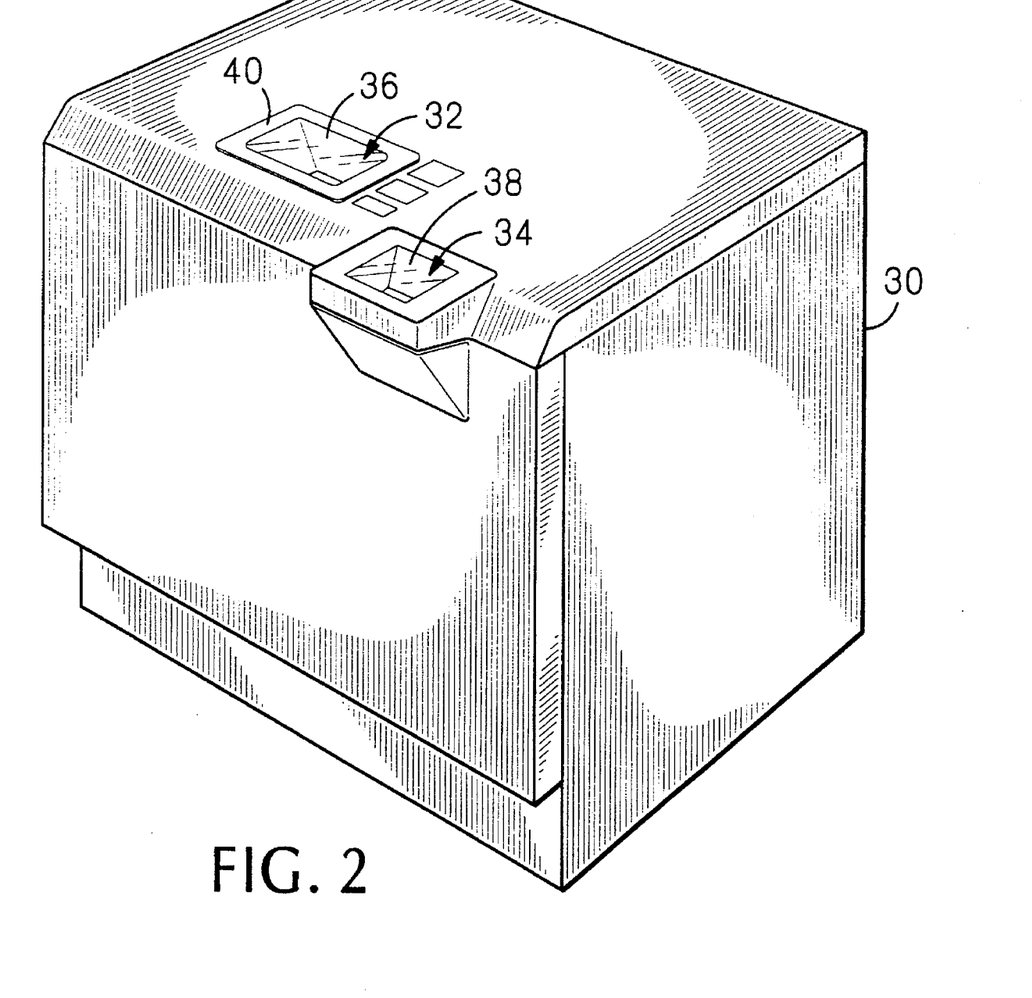
FIG. 2 is a perspective view of a fingerprint image capture device according to the invention.

Referring now to FIG. 2, a fingerprint image scanner according to the invention is contained in a sealed enclosure 30. Set in the top of the enclosure 30 are two optical platen prisms 32, 34. One of the optical platen prisms 32 has a rectangular-shaped finger receiving surface 36 that is approximately 3.2 inches wide and about 2 inches high, and is used for taking a plain image of four fingers. The other optical platen prism 34 has a finger receiving surface 38 approximately 1.6 inches wide by 1.5 inches high, and is used for obtaining a rolled image of a single fingerprint. The dimensions of the optical platen prisms 32, 34 correspond to the sizes of boxes 20, 18 printed on a typical ten-print fingerprint card, illustrated in FIG. 1, for taking four finger slap prints and roll prints, respectively. The scanner includes two optical systems located within the enclosure 30, one associated with each of the optical platen prisms 32, 34.

The optical system for obtaining a four-finger plain image will now be described in detail. Platen prism 32 is optically transparent and is preferably fabricated from a material having an index of refraction $N_P$ of at least 1.4. Platen prism 32, and also platen prism 34, can be made from, for example, acrylic plastic ($N_P$=1.491), polycarbonate plastic ($N_P$=1.586), crown glass (BK 7) ($N_P$=1.517), flint glass (SF 2) ($N_P$=1.648), or any other suitable optical material having an index of refraction significantly greater than that of air. Platen prism 32 is mounted within an aperture in the top of enclosure 30. A bezel 40 surrounds the finger receiving surface 36.

Figure 3:
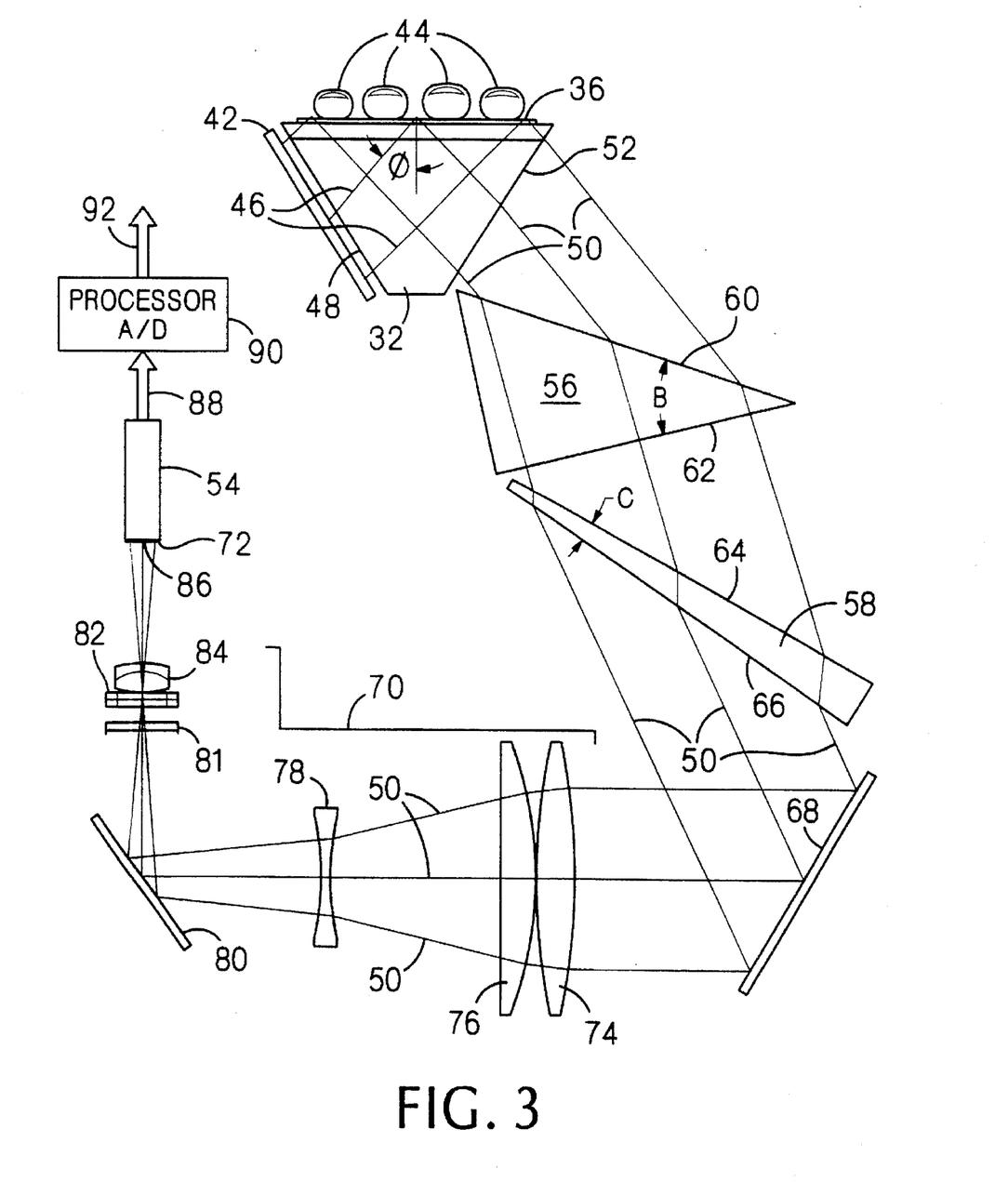
FIG. 3 is a sectional view of the optical system components of the device illustrated in FIG. 2 for obtaining a four-finger plain image.

Referring now also to FIG. 3, a light source 42 illuminates the underside of up to four fingers 44 that are in contact with upper surface 36 of platen prism 32. It should be noted that in FIG. 3, the short dimension, or height, of finger receiving surface is perpendicular to the page and the long dimension, or width, is shown parallel to the page. It will also be understood that structures supporting optical components illustrated in FIG. 3 are not shown for clarity.

The light source 42 can be a light panel, edge lit by red light emitting diodes (LED's), such as, for example, model HLCP-c100, manufactured by Hewlett Packard of Cupertino, Calif. The illumination light 46 enters the platen prism 32 through a side surface 48 that is angled inward from finger receiving surface 36 by an angle A that is preferably about 56° for an acrylic platen prism. Light internally reflected 50 from the finger receiving surface 36 exits the optical platen prism 32 through another angled side surface 52 that is transverse to the direction of the height of the finger receiving surface 36. An imaging system that includes an imaging camera 54 is structured and arranged to receive the reflected light 50 that is internally reflected from the finger receiving surface at a predetermined angle φ.

Figure 4:
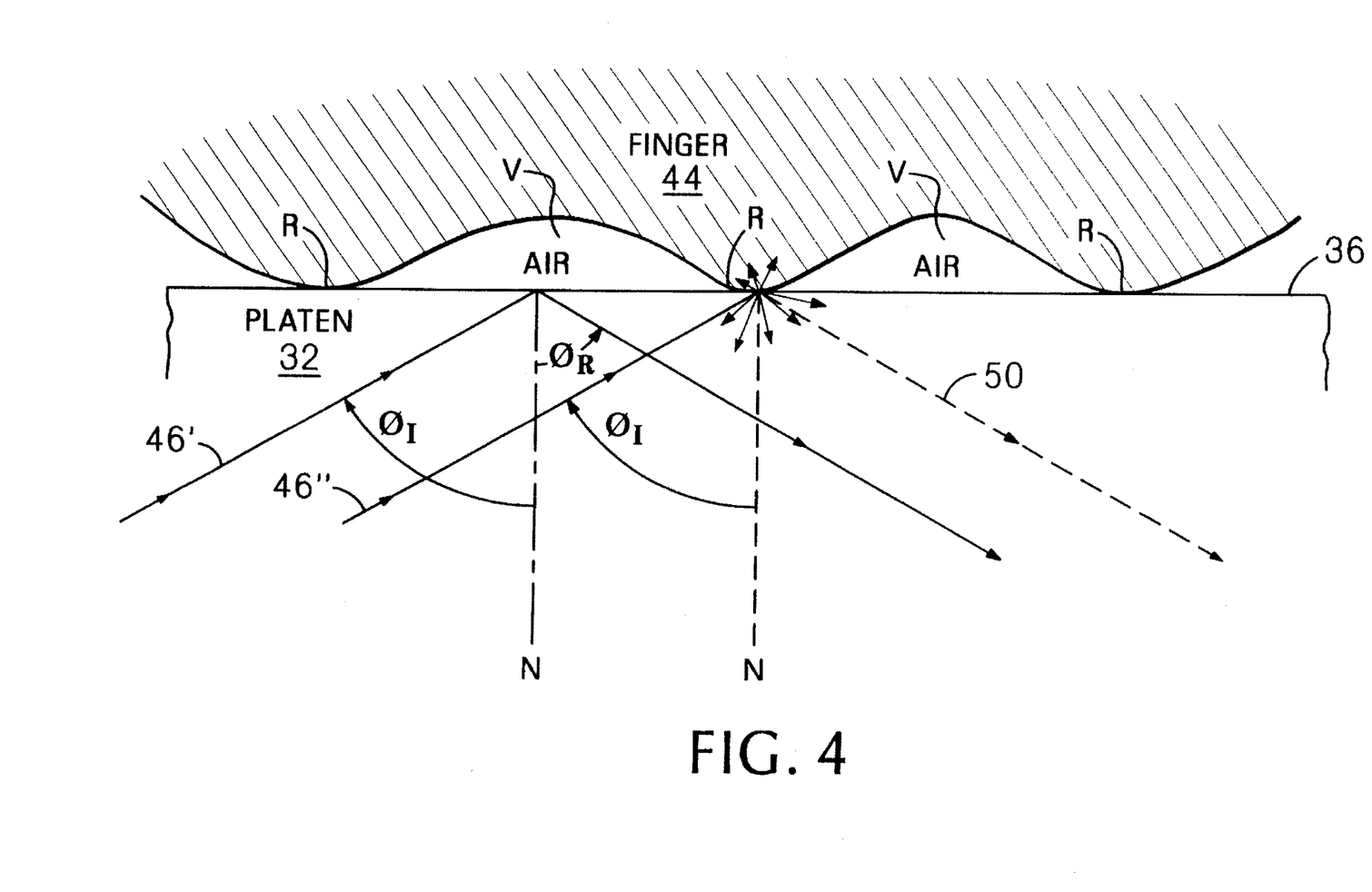
FIG. 4 is a schematic sectional view of a portion of a finger on an optical platen prism, illustrating how a reflection image of a fingerprint is formed.

Referring now also to FIG. 4, the surface topography of one of the fingers 44 includes a pattern of ridges R and intermediate valleys V. The ridges R contact finger receiving surface 36 of platen prism 32 while the valleys V do not. Air will typically fill the valleys V when a dry finger is placed on platen prism 32.

Illumination light 46 strikes the finger receiving surface 36 from within the platen prism 32 at an angle of incidence $\phi_I$ measured with respect to a normal N to the finger receiving surface 36. If the incident light, in this case indicated by ray 46', illuminates a bare portion of the finger receiving surface, such as underneath a valley V, with an incidence angle $\phi_I$ that is greater than the critical angle $\phi_{AP}$ for the interface between platen prism 32 and the air above finger receiving surface 36, then the incident light 46' will be internally reflected from the finger receiving surface 36 at a reflection angle $\phi_R$ that is equal to the incidence angle $\phi_I$. The critical angle $\phi_{AP}$ is defined as the smallest angle of incidence $\phi_I$ for which light striking the platen/air interface is totally internally reflected within platen prism 32 according to the relation $N_A/N_P=\sin \phi_{AP}$, where $N_A$ and $N_P$ are the indices of refraction for air and the platen prism material, respectively.

When the incident light, indicated by ray 46", illuminates a portion of the finger receiving surface 36 that is in contact with a ridge R, then finger receiving surface 36 does not totally internally reflect the incident light 46". Finger 44 has an index of refraction $N_F$ that is greater than $N_A$, and the light source 42 is oriented such that the incidence angle $\phi_I$ is less than the critical angle $\phi_{FP}$ for total internal reflection from the platen/finger interface. The platen/finger interface instead refracts the incident light 46" where it is partially absorbed and partially dispersed by finger 44. Only a small portion of light reflected from ridge R will be directed at reflection angle $\phi_R$.

The pattern of internally reflected light 50 forms a reflection image of the surface characteristics of the fingers 44. Dark areas of the reflection image correspond to raised surface features, and light areas of the reflection image correspond to indented surface features and the areas bordering the fingers 44.

Referring now again to FIG. 3, the width of the reflection image is smaller than the width of the finger receiving surface 36 by a factor of cos φ, where φ is about 46°. However, the height of the reflection image is the same as the height of the finger receiving surface 36.

The second side surface 52 of platen prism 32, like the first side surface 48, is set at an angle A of about 56° from the finger receiving surface 36. The reflected light 50 forming the reflection image will be refracted at the second side surface 52 and the width of the reflection image foreshortened further upon leaving second side surface 52.

The width of the reflected light 50 is then expanded by a first refracting prism 56 and then reduced by a second refracting prism 58. Because of its large size, first refracting prism 56 is preferably made of an inexpensive material, such as acrylic. It has light transmitting surfaces 60 and 62 that define an included angle B that is preferably about 30.7°. Second refracting prism 58 is preferably made of a high index material, such as flint glass SF4. Second refracting prism 58 has light transmitting surfaces 64 and 66 that define an included angle C that is preferably about 4.7°.

The set of three prisms, 32, 56 and 58, provide enough surfaces to anamorphically magnify the compressed reflection image from surface 36. Their positions and angles must be optimized to provide the desired magnification while avoiding astigmatism. The system has severe chromatic aberration and thus a broadband light source, such as a white light lamp, must be avoided. The red LED illumination from light source 42 satisfies this condition.

The set of three prisms, 32, 56 and 58, is structured and arranged to reduce the aspect ratio from the original 1.6:1 at the finger receiving surface 36 to an aspect ratio of 1.33:1 when leaving surface 66. The change is achieved without altering the height of the reflection image. The entire change in the aspect ratio of the reflection image is obtained by adjusting its width. Note that the chief rays (i.e. the rays which pass through the center of the aperture stop of the system) from each point must be parallel through the prisms. This is necessary to maintain symmetry across the whole image. Otherwise, the differences in the refraction angles between the paths will introduce geometric distortions into the image and more astigmatism away from the center.

A first surface mirror 68 directs the reflected light 50 from surface 66 to telecentric optics 70 that image the reflected light 50 onto a CCD array 72 in camera 54. The telecentric condition, wherein the chief rays at different points of the input are parallel with each other, is effected by lenses 74, 76 and 78. These lenses, 74, 76 and 78, are large enough to input the parallel rays from the prisms, and have the system aperture, formed by iris 82, at their rear focal point. The particular configuration of two convex lenses, 74 and 76, and one concave lens, 78, is necessary to reduce the aberration caused by one very large but strong lens.

Another first surface mirror 80 redirects the reflected light 50 to an optical band pass filter 81, then to the iris 82, and then to a doublet lens 84. The filter 81 reduces the effect of outside lighting by limiting the reflected light to a bandwidth of about 50 nm centered on the red wavelength of the LED illumination. Doublet lens 84 focuses the reflected light 50 onto a receiving surface 86 of the camera CCD array 72.

CCD array is a ⅔ inch array with dimensions of 8.8 mm width and 6.6 mm height. The total magnification through the lenses is chosen to focus the 2 inch height of the finger receiving surface image onto the 6.6 mm dimension of the CCD array 72. Since the prisms have corrected the aspect ratio of the reflection image leaving surface 66 to 1.33:1, the reflection image corresponding to the 3.2 inch width of the platen receiving surface 36 is focused onto the 8.8 mm dimension of the CCD array 72, thus fully utilizing the array's detector area.

Other CCD's of different sizes but the same aspect ratio can be accommodated by changing the magnification of the lens set.

The camera 54 provides a seamless, four-finger image signal 88 of the entire 3.2 inch by 2 inch finger receiving surface 36 in response to the reflection image received by the CCD array 86. Since the optical system fully utilizes the active area of the CCD array 72, the aspect ratio of the image signal 88 is determined by the ratio of the number of samples taken in each line of the total number of lines that are output from the CCD array 72. For a CCD that produces 976 lines of information, which is close to the 1000 pixels which would be desirable for a 2 inch plain image height, the lines of information can be sampled by the processing components 90, which typically include a flash A/D converter, following the camera. The processing components 90 samples the image signal 88 at a clock rate chosen to create a final image signal 92 having 1600 pixel samples in each horizontal line, which is sufficient to meet most law enforcement agency image resolution standards. The invention thus matches the aspect ratio of the finger receiving surface 36 for the four finger plain image.

The embodiment described above forms the reflection image from a pattern of light internally reflected from a platen/air interface at the platen finger receiving surface, i.e. the strong image. Alternatively, the optical system of the invention can use the weak, or negative image technique to form an image of opposite polarity of that described above. However, the optical system for adjusting the platen aspect ratio to that of the CCD array remains the same.

Figure 5:
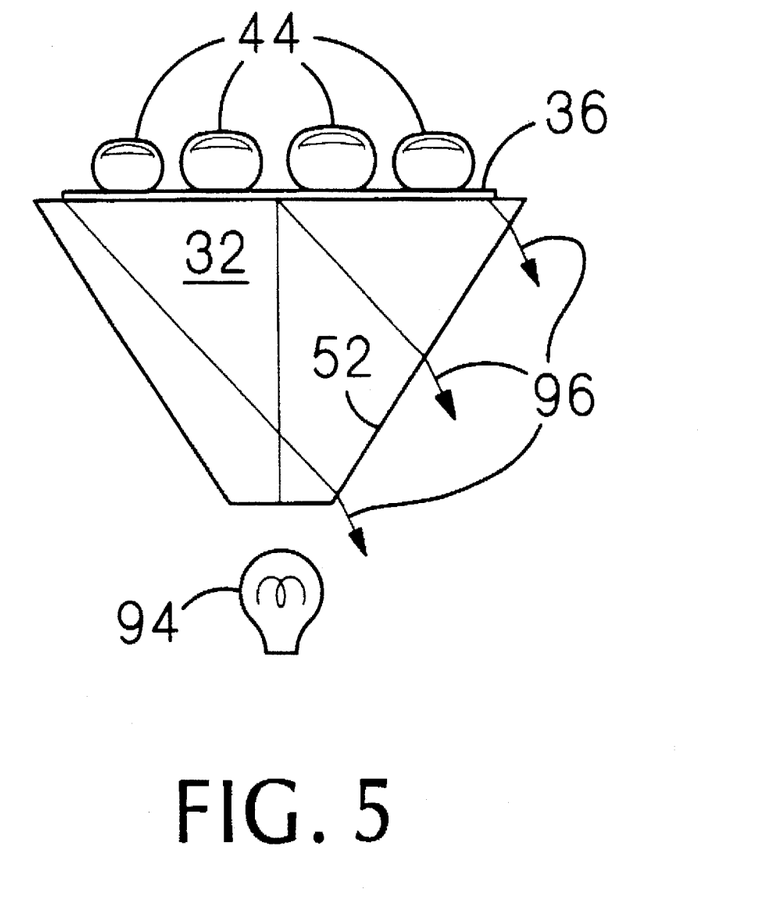
FIG. 5 schematically shows illumination of a platen prism to form a weak image.

Referring now to FIG. 5, a lamp 94 illuminates the fingers 44 from directly below platen prism 32. A pattern of diffused light 96 forming a diffused light image of the surface characteristics of the fingers leaves side surface 52 of platen prism 32. Diffused light 96 from where fingers 44 contact finger receiving surface 36 is imaged along the same path as in the strong image case described above. In adjusting the image aspect ratio, the width of the image is adjusted, not the height. A magnification is chosen to match the height of the finger receiving surface to the height of the CCD array. However, the increased light requirements must be balanced with the need to limit the bandwidth of the light for good resolution.

The preferred embodiments shown have the notable advantages of compactness, low distortion and good resolution across the entire image with the use of low cost components. Other methods can be used to effect the matching of the aspect ratios at the loss of some of these advantages.

While the invention has been described above with reference to particular preferred embodiments, a range of other equivalent embodiments can also be produced by substitution of different optical materials for the ones described above and by making commensurate changes in the refraction angles of the various components and their spacings. A variety of different optical prescriptions can produce equivalent results. Therefore, reference should be made to the following claims in assessing the true scope of the invention in which exclusive rights are claimed.

What is claimed is:

1. A device for providing a plain image signal indicative of a plain image of surface characteristics of a plurality of fingers on a hand, comprising:
    a plain platen prism, including a flat, rectangular shaped finger receiving surface having a width and a height shorter than the width, the width divided by the height defining a platen aspect ratio that is greater than 1.1:1;
    an illumination source for internally illuminating the finger receiving surface such that a plain image of the surface characteristics of the fingers is formed, and wherein the plain image leaves the platen prism from an image side surface in a direction transverse to a direction of the height of the finger receiving surface;
    a camera having a rectangular receiving surface having a camera aspect ratio of greater than 1.1:1 and less than the platen aspect ratio, said camera being structured and arranged to receive the plain image and to provide the plain image signal in response thereto; and
    optical elements structured and arranged to direct the plain image to the camera, including refracting elements structured and arranged to change the aspect ratio of the plain image to approximately equal the camera aspect ratio.

2. The device of claim 1, wherein the camera aspect ratio is approximately 1.33:1 and the platen aspect ratio is approximately 1.6:1.

3. The device of claim 1, wherein the plain image is formed from a pattern of light internally reflected from bare portions of the finger receiving surface.

4. The device of claim 3, wherein the illumination source illuminates the finger receiving surface from an illumination side surface opposite the image side surface.

5. The device of claim 4, wherein the image side surface forms an acute angle with the finger receiving surface.

6. The device of claim 5, wherein the refracting elements include first and second prisms structured and arranged to cooperatively increase the aspect ratio of the plain image.

7. The device of claim 6, wherein the platen prism is fabricated of acrylic plastic, wherein the acute angle formed by the image side surface with the finger receiving surface is about 54 degrees, and wherein the plain image is internally reflected from the finger receiving surface at about 46 degrees from a normal to the finger receiving surface.

8. The device of claim 6, wherein the first prism is fabricated of acrylic plastic, and wherein the second prism is fabricated of crown glass.

9. The device of claim 8, wherein the first prism includes a pair of surfaces for expanding the width of the plain image and defining an angle of approximately 30.7 degrees, and wherein the second prism includes a pair of surfaces for contracting the width of the plain image subsequent to being expanded by the first prism and defining an angle of approximately 4.7 degrees.

10. The device of claim 1, wherein the plain image is formed from a pattern of light diffused from covered portions of the finger receiving surface.

11. The device of claim 1, wherein the receiving surface of the camera comprises a rectangular-shaped array of light intensity-sensing elements.

12. A device for providing a seamless plain image signal indicative of a plain image of surface characteristics of a plurality of fingers on a hand, comprising:
    a plain platen prism comprising a flat, rectangular shaped finger receiving surface having a width being approximately 3.2 inches and a height of approximately 2 inches, and spaced apart first and second side surfaces extending from shorter edges of the finger receiving surface and forming respective acute angles with the finger receiving surface;
    a light source being structured and arranged to illuminate the finger receiving surface from the first side surface at a selected angle φ from a normal to the finger receiving surface such that light internally illuminating a bare portion of the finger receiving surface is internally reflected from the finger receiving surface and light internally illuminating a contacted portion of the finger receiving surface in contact with the fingers is not internally reflected at the finger receiving surface such that a plain image of the surface characteristics of the fingers is internally reflected from the finger receiving surface;
    a CCD camera comprising a rectangular array of light intensity sensing elements arranged on a receiving surface having a width and height defining an aspect ratio of approximately 1.33:1, structured and arranged to receive the plain image from the second side surface of the optical platen prism and to provide the plain image signal in response thereto; and optical elements structured and arranged to direct the plain image to the camera, including refracting elements structured and arranged to adjust the aspect ratio of the plain image to approximately match the aspect ratio of the receiving surface of the camera.

13. The device of any of claims 1–12, wherein the device includes no movable parts.

14. The device of claim 13, wherein the camera is the only camera in the device for providing the plain image signal.

15. A method of providing a seamless plain image signal representing surface characteristics of a plurality of fingers on a hand, comprising:

providing a plain platen prism comprising a flat, rectangular shaped finger receiving surface having a width being greater than a height, a ratio of the width to the height defining a platen aspect ratio that is greater than 1:1;

placing each of a plurality of fingers on a hand on the finger receiving surface;

internally illuminating the finger receiving surface;

forming a plain image from a pattern of light from the finger receiving surface, the first image being indicative of the surface characteristics of the fingers, wherein the plain image is directed transverse to a direction defined by the finger receiving surface height;

providing a single camera comprising a rectangular shaped camera receiving surface having a width and a height defining a camera aspect ratio that is greater than 1.1:1 and less than the platen aspect ratio;

directing the plain image to the camera receiving surface, including changing the aspect ratio of the plain image to approximately equal the camera aspect ratio; and receiving the plain image on the camera receiving surface and providing the plain image signal in response thereto.

16. The method of claim 15, wherein the platen aspect ratio is approximately 1.6:1, and wherein the camera aspect ratio is approximately 1.33:1.

17. The method of claim 16, wherein the finger receiving surface is approximately 3.2 inches wide and approximately 2 inches high.

18. The method of claim 15, wherein forming the plain image includes forming the plain image from light internally reflected from bare portions of the finger receiving surface.

19. The method of claim 15, wherein providing a camera includes forming the camera receiving surface from a CCD array.

20. The method of any of claims 15–19, further including locating each of the plain platen prism and the camera at fixed positions.

21. The method of claim 20, further comprising sampling the plain image signal at a clock rate chosen to create a final image signal having 1600 pixel samples in each horizontal line along its width.

22. A device for providing a plain image signal indicative of a plain image of surface characteristics of fingers on a hand, comprising:

a plain platen prism, including a flat, rectangular-shaped finger receiving surface;

an illumination source being structured and arranged to internally illuminate the finger receiving surface such that a plain image of the surface characteristics of the fingers is formed, the plain image having a plain image aspect ratio;

a camera including a receiving surface having a camera aspect ratio being different from the plain image aspect ratio, said camera being structured and arranged to receive the plain image and to provide the plain image signal in response thereto; and optical elements structured and arranged to direct the plain image to the camera and to change the aspect ratio of the plain image to approximately equal the camera aspect ratio.

23. A device for providing a plain image signal indicative of a plain image of surface characteristics of fingers on a hand, comprising:

a plain platen prism, including a flat, rectangular-shaped finger receiving surface having a height in a longitudinal direction being smaller than its width, and a side surface having an edge in common with the finger receiving surface that extends in the longitudinal direction;

an illumination source being structured and arranged to internally illuminate the finger receiving surface; and a camera arranged to receive a plain image of the surface characteristics of the fingers directed through the side surface.

* * * * *